United States Patent [19]

Piliavin et al.

[11] Patent Number: 4,482,213

[45] Date of Patent: Nov. 13, 1984

[54] PERIMETER SEAL REINFORCEMENT HOLES FOR PLASTIC LCDS

[75] Inventors: Michael A. Piliavin; Jeffrey B. Sampsell, both of Plano; Perry A. Penz, Richardson, all of Tex.

[73] Assignee: Texas Instruments Incorporated, Dallas, Tex.

[21] Appl. No.: 444,263

[22] Filed: Nov. 23, 1982

[51] Int. Cl.³ .................. G02F 1/133; B65D 73/00
[52] U.S. Cl. ................................ 350/334; 350/343; 206/484; 383/119
[58] Field of Search ............... 350/334, 343, 589, 590; 206/484; 383/119

[56] References Cited

U.S. PATENT DOCUMENTS

| | | | |
|---|---|---|---|
| 3,190,499 | 6/1965 | Dow | 206/484 X |
| 3,194,364 | 6/1963 | Kolm | 350/589 X |
| 3,781,087 | 12/1973 | Nagasaki | 350/343 |
| 4,226,509 | 10/1980 | Jacobs | 350/343 |

FOREIGN PATENT DOCUMENTS

| | | | |
|---|---|---|---|
| 0395021 | 12/1965 | Switzerland | 383/119 |
| 0678676 | 9/1952 | United Kingdom | 350/590 |

*Primary Examiner*—John K. Corbin
*Assistant Examiner*—David Lewis
*Attorney, Agent, or Firm*—William E. Hiller; James T. Comfort; Melvin Sharp

[57] ABSTRACT

To increase the perimeter seal strength of plastic LCDs, reinforcement holes are formed in the plastic substrate at the maximum stress points. These holes, which are not in contact with any active area of the device, are filled with glue, so that each pair of holes in the upper and lower substrates forms a tensile connection which directly links the two substrates together at the maximum stress points.

11 Claims, 4 Drawing Figures

PERIMETER SEAL REINFORCEMENT HOLES FOR PLASTIC LCDS

BACKGROUND AND SUMMARY OF THE INVENTION

The present invention relates to liquid crystal devices having flexible substrates.

The plastic substrate LCD technology provides substantial advantages of manufacturing cost, durability, and thinness. However, one respect in which the known plastic LCD technology could be improved is avoidance of separation of substrates at the corners. That is, the prior art plastic LCD device usually has the substrate portions protruding slightly beyond the glue seal, as shown in FIG. 1, so that the corner of the glue perimeter seal is a very high stress point, where the two substrates could conceivably be pried apart.

Thus, it is an object of the present invention to provide a method for sealing the perimeter of a liquid crystal device, so that points of maximum stress are reinforced to prevent separation of the substrates.

A further complication in assembly of flexible substrate liquid crystal devices is that the inner surface of the substrate is typically not particularly good for adhesion. That is, deposition of the alignment layer and metallization layers are likely to degrade adhesion of the perimeter areas in which adhesion must be attained, even if those perimeter areas are screened off or attempted to be screened off during deposition of the alignment and metallization layers.

Thus a further object of the present invention is to provide a method for sealing displays made with flexible substrates together, using a sealing means which is not solely dependent on adhesion to the inner surface of the substrate.

The present invention teaches formation of holes in the upper and lower substrates, at the substrate perimeter area. Thus, not only does the perimeter seal glue establish surface-to-surface cohesion over the relatively limited area of the perimeter seal, but also, at the reinforcement holes, glue adheres to the sidewalls of the holes in the upper and lower substrates, so that what is in effect a rivet of hardened glue secures the substrate adhesion at the maximum stress points.

According to the present invention there is provided: a method for assembling a liquid crystal device, comprising the steps of: providing first and second flexible substrates, each said substrate being provided with a conductor layer, and an alignment layer over said conductor layer, on a first surface thereof; providing reinforcement holes near the perimeter of at least one said substrate; providing glue around the perimeter of said first face of at least one of said substrates; and gluing said first and second substrates together, so that said glue forms a perimeter seal to define an enclosed cavity between said first substrate and said second substrate, and introducing glue into said reinforcement holes.

According to the present invention there is also provided: a liquid crystal device, comprising: a first substrate comprising a flexible material, said first substrate having a conductor layer, and an alignment layer on said conductor layer, on at least a central portion of a first surface of said substrate; a second substrate, comprising a flexible material, said first substrate having a conductor layer, and an alignment layer on said conductor layer, on at least a central portion of a first surface of said substrate; said first and second substrates being joined along the respective perimeters thereof by a glue seal, said glue seal extending along substantially the entire perimeter of said first and second substrates, said first and second substrates being joined so that said first surfaces of both said substrates mutually face together and define a cavity therebetween; a liquid crystal material filling said cavity; at least one said substrate containing reinforcement holes near the perimeter of said first face thereof, said holes being at least partially filled with hardened glue.

BRIEF DESCRIPTION OF THE DRAWINGS

The present invention will be described with reference to the accompanying drawings, wherein.

DESCRIPTION OF THE PREFERRED EMBODIMENTS

Formation of a plastic liquid crystal device is generally described in issued U.S. Pat. No. 4,228,574, which is hereby incorporated by reference. In general, such a device must include upper and lower substrates 102 and 104, conductor layers 110 and 112 on the inner surface of both the upper and lower substrates, alignment layers 114 and 116 on the inner surface of both substrates overlying the conductor layers, a perimeter seal holding the upper and lower substrates together all around their perimeters, so as to define a fairly flat volume between the two substrates in which liquid crystal material is held, and liquid crystal material to fill the volume. In addition, other elements normally used include polarizers, which may be separate from the substrates or may be integrated with them as described in pending U.S. patent application No. 317,087, filed 11/2/81, (TI-7755A), a spacer material, which may be part of the perimeter seal or may be inside the perimeter seal, external electrode pads for connection to the upper and lower conductive layers, mirrors, backside illumination layers, or other layers.

In particular, the perimeter seal regions can be formed by running a bead of epoxy around one of the two substrates, or by applying a shaped fiberglass preform 108 saturated with epoxy to one of the substrates 102 or 104 (as is presently preferred), and then aligning the two substrates 102 and 104 and pressing them together, so that the epoxy forms a perimeter glue seal region. Subsequently, liquid crystal material is injected into the cavity defined between the two substrates, the fill hole is sealed, and connections are made to form a functioning liquid crystal device.

Figure 1:
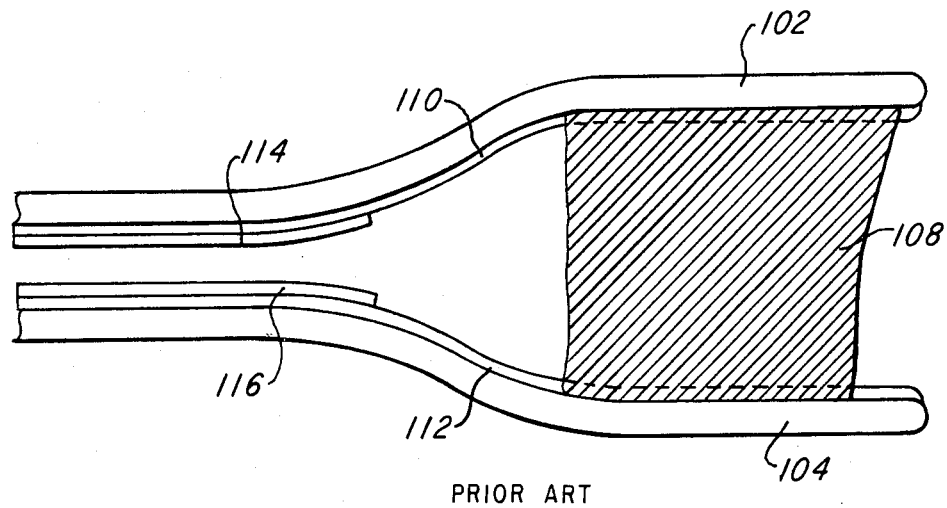
FIG. 1 shows the corner of a prior art plastic liquid crystal display.
Figure 2:
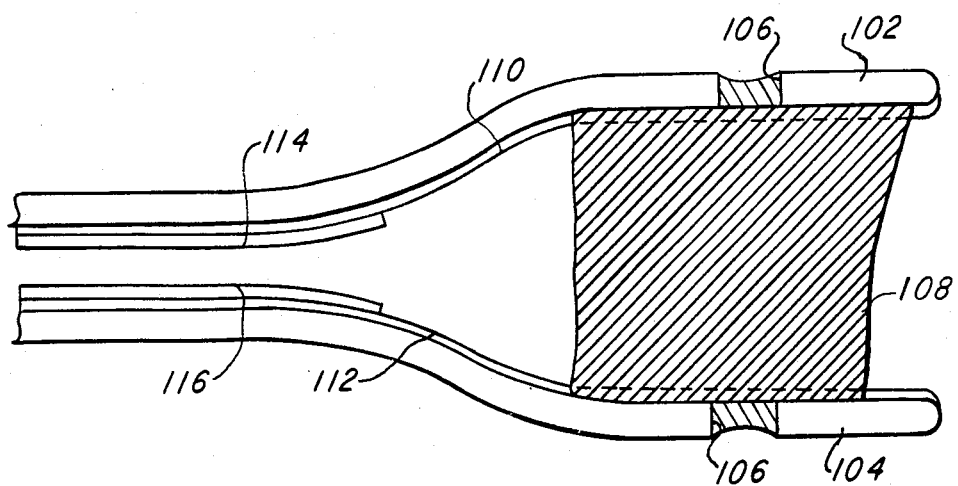
FIG. 2 shows a section of an assembled plastic liquid crystal device, including a reinforcement structure according to the present invention.
Figure 3:
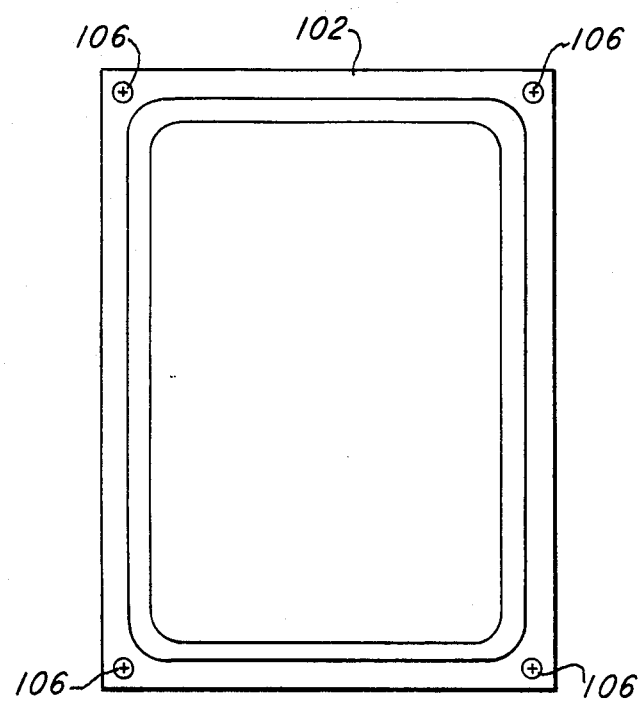
FIG. 3 shows a plan view of a complete liquid crystal device having a plurality of reinforcing structures at maximum stress points, according to the present invention.
Figure 4:
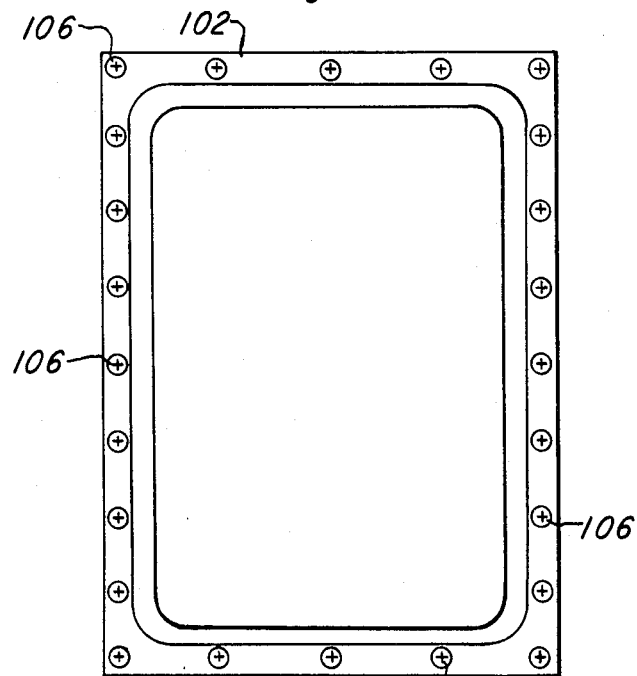
FIG. 4 shows a plan view of a complete liquid crystal display device having additional reinforcing structures along the perimeter of the device and not at the maximum stress points only.

The present invention teaches use of glue-filled holes in the substrate to add further cohesion between the two substrates 102 and 104 at the points of maximum stress. That is, for example, in a device as shown in FIG. 3, reinforcement holes 106 are added at the four corners of the device, since it is at those areas that forces are most likely to be applied to separate the substrates 102 and 104. Alternatively, more than one of these reinforcement holes 106 could be added at each of the corners of the device shown, or as shown in FIG. 4 even more reinforcing points can be added along more of the perimeter of the devices, and not at the maximum stress points only.

It should also be noted that the use of such reinforcement holes is not limited to two layer devices, but can also be applied to three- or more-layer liquid crystal devices.

It should also be noted that the reinforcement holes 106 according to the present invention do not necessarily have to be located within the main perimeter seal 108. That is, the reinforcement holes could also be located outboard of the perimeter seal. However, such an arrangement requires more process steps than locating the reinforcement holes 106 within the body of the perimeter seal 108.

Thus the present invention provides the advantage of increased mechanical strength, and therefore increased durability, for a flexible-substrate liquid crystal display.

A typical substrate material, which is used in the presently preferred method of using the invention, is one-dimensionally stretched polyester plastic, approximately seven mils thick. However, many other transparent plastics, such as polyimide or polycarbonate, can be used for the substrate 102 or 104.

The holes 106 formed in the substrate are, in the presently preferred embodiment, 20 mils wide. However, a very wide range of other hole widths can be used.

It is preferable that the reinforcement holes 106 of the present invention not be located in direct contact with the liquid crystal material itself, since this would restrict the rivet epoxy to be compatible with the liquid crystal and limit the choice of epoxies.

The final filling operation, which introduces liquid crystal into the cavity between the substrates, may slightly affect the shape of the perimeter glue seal. That is, where the final fill hole is defined through the glued perimeter seal region, the glue seal may optionally be not entirely continuous, but be interrupted to define a fill hole. An alternative method is to provide a fill hole in one or both substrates, rather than through the perimeter glue seal. In this case the glue seal is preferably formed to be entirely continuous around the perimeter of substrates. In either case, the application of the present invention is not greatly affected.

The holes 106 into which glue is to protrude to form the reinforcement structures need not be formed by a punch, but can also be formed by a toothed wheel, for example, for rapid automatic formation of such holes at equally spaced intervals. In a further embodiment, a rotating wheel having a number of punches mounted around its periphery can be mounted opposite a rotating wheel having a number of dyes around its periphery, and the plastic substrate film can be moved through this arrangement in a continuous sheet, so that an equally-spaced series of reinforcement holes is automatically formed. Alternatively, a repeatedly and continuously actuated punch and dye can simply be used to punch a moving strip of substrate material.

In this case, reinforcement holes 106 according to the present invention provide a generally increased mechanical strength around the whole perimeter of the device. However, where more labor intensive methods of forming the reinforcement holes are used, as in the presently preferred best mode, formation of only a few reinforcement holes at the points of maximum stress is the most economical way to improve the device characteristics without greatly increasing manufacturing cost.

Antoher key advantage of the present invention is that different glue compositions can be used for the perimeter seal and for the reinforcement hole portions. That is, the perimeter glue seal is required to be compatible with the liquid crystal material, and not provide a source of contaminants to the liquid crystal material. By contrast, if the reinforcement holes are glued in a separate glue application, a different glue can be used, which is not subject to this strict requirement of chemical compatibility. Thus, in the presently preferred embodiment, the perimeter is sealed with an epoxy with very low outgassing, such as Ablestik 517, and the reinforcement holes are separately glued using a fast-setting high-strength epoxy, such as "extra-fast setting epoxy", marketed by Hardman.

It should be also noted that it is not necessary that the reinforcement holes 106 in the upper and lower substrates 102 and 104 be aligned. That is, the key strength limitation is not cohesion of the epoxy glue layer itself, but rather adhesion of the epoxy glue layer to the substrate 102 and 104. The reinforcement holes 106 according to the present invention greatly increase the strength of adhesion.

It is also possible to form the reinforcement holes 106 according to the present invention after the substrates have already been glued together using the perimeter glue seal. In the presently preferred best mode of practicing the invention, the four reinforcement holes 106 are punched through both substrates, at the corners of the display, after the perimeter glue seal has been formed.

As will be apparent to those skilled in the art, a wide range of modifications and variations can be used in practicing the present invention, which is accordingly not limited except as recited in the accompanying claims.

It will be obvious to those skilled in the art that the present invention may be practiced in a wide range of modifications and variations. The present invention is not limited except as specifically recited in the appended claims.

What is claimed is:

1. A method for assembling a liquid crystal device, comprising the steps of:
    providing first and second flexible substrates, each said substrate being provided with a conductor layer, and an alignment layer over said conductor layer, on a first surface thereof;
    providing reinforcement holes near the perimeter of at least one said substrate;
    providing glue around the perimeter of said first face of at least one of said substrates; and
    gluing said first and second substrates together, so that said glue forms a perimeter seal to define an enclosed cavity between said first substrate and said second substrate, and introducing glue into said reinforcement holes.

2. The method of claim 1, wherein a fill hole is defined in at least one of said substrates, and further comprising the subsequent steps of:
    filling said cavity with liquid crystal material, said liquid crystal material being introduced through said fill hole; and sealing said fill hole.

3. The method of claim 2, wherein each said substrate comprises stretched polyester.

4. The method of claim 1, wherein said first and second substrates are separated at said perimeter glue seal by a spacer.

5. The method of claim 1, wherein a first glue composition is provided around the perimeter of said first face of at least one of said substrates, and a second glue composition is introduced into said reinforcement holes, said second glue composition having a greater tensile strength than said first glue composition.

6. The method of claim 1, wherein said step of providing holes is performed after said step of gluing said substrates together.

7. The method of claim 1, wherein said substrates are rectangular, and wherein reinforcement holes are formed at the corners of said substrates.

8. A liquid crystal device, comprising:
 a first substrate comprising a flexible material, said first substrate having a conductor layer, and an alignment layer on said conductor layer, on at least a central portion of a first surface of said substrate;
 a second substrate, comprising a flexible material, said first substrate having a conductor layer, and an alignment layer on said conductor layer, on at least a central portion of a first surface of said substrate;
 said first and second substrates being joined along the respective primeters thereof by a glue seal, said glue seal extending along substantially the entire perimeter of said first and second substrates, said first and second substrates being joined so that said first surfaces of both said substrates mutually face together and define a cavity therebetween;
 a liquid crystal material filling said cavity;
 at least one said substrate containing reinforcement holes near the perimeter of said first face thereof, said holes being at least partially filled with hardened glue.

9. The device of claim 8, wherein said holes formed in said respective substrates are not in contact with said liquid crystal material.

10. The device of claim 8, wherein said holes are provided in the perimeter of said substrates at at least the maximum stress portions of said device.

11. The device of claim 8, wherein said reinforcement holes are provided intermittently around the entirely perimeter of each said substrate.

* * * * *